United States Patent
Kannan et al.

(10) Patent No.: US 8,805,370 B1
(45) Date of Patent: Aug. 12, 2014

(54) HAND-OUT AND HAND-IN SUPPORT FOR LEGACY MOBILES SERVICED BY A FEMTOCELL ATTACHED TO AN IMS NETWORK

(75) Inventors: Vinod Kannan, Acton, MA (US); Shasidhar Kura, Shrewsbury, MA (US)

(73) Assignee: Taqua Wireless, LLC, Richardson, TX (US)

(*) Notice: Subject to any disclaimer, the term of this patent is extended or adjusted under 35 U.S.C. 154(b) by 555 days.

(21) Appl. No.: 12/404,064

(22) Filed: Mar. 13, 2009

Related U.S. Application Data (63) Continuation-in-part of application No. 12/172,238, filed on Jul. 13, 2008, and a continuation-in-part of application No. 11/157,498, filed on Jun. 21, 2005.

(60) Provisional application No. 61/201,836, filed on Dec. 15, 2008, provisional application No. 60/949,846, filed on Jul. 14, 2007.

(51) Int. Cl.
*H04W 36/00* (2009.01)
*H04W 40/00* (2009.01)
*H04L 12/28* (2006.01)
*H04W 4/00* (2009.01)

(52) U.S. Cl.
USPC ........... 455/436; 455/444; 455/445; 370/254; 370/338

(58) Field of Classification Search
CPC ... H04W 88/16; H04W 92/14; H04L 65/1016
USPC ......... 370/252, 329, 337, 338, 335, 353, 389, 370/401, 436; 455/411, 418, 466
See application file for complete search history.

(56) References Cited

U.S. PATENT DOCUMENTS

| 6,029,065 A | 2/2000 | Shah |
| 7,043,263 B2 | 5/2006 | Kaplan et al. |

(Continued)

OTHER PUBLICATIONS

Asa Kalavade, SIP Based Architecture for Integration of 1xRTT Femtocells, presented in Oct. 2007 at the 3GPP2 Femto Cell Workshop in Boston; see pp. 20-25 of the file S00-FEMTO-20071015-002_Tatara Submission-1xRTT_Femtocells_in_SIP_Architecture.pdf located at ftp://ftp.3gpp2.org/TSGS/Working/_2007/2007-10-Femto_Cell_Workshop-Boston/.

*Primary Examiner* — Dwayne Bost
*Assistant Examiner* — Scott Trandai
(74) *Attorney, Agent, or Firm* — Yee & Associates, P.C.

(57) ABSTRACT

The present disclosure is directed to a system and method configured to implement an inter-MSC based handoff of a mobile device between a packet switched network and a mobile core network. In embodiments implementing a handoff from a femtocell to a macrocell, from the perspective of a neighboring MSC on a mobile core network, IP or VOIP information from a femtocell which is in communication with the convergence server, is perceived as having the same protocol as information which originates from a macrocell. Inversely, in embodiments implementing a hand-in to the femtocell from a macrocell, information which originates from a macrocell, which is in communication with the convergence server, would be perceived as IP or VOIP code to the femtocell. Accordingly, a target MSC in a handoff is agnostic of the fact that the mobile device entering into the macrocell was actually attached to a femtocell. Thus, embodiments of the present invention allow existing inter-MSC based handoff solutions to be leveraged.

22 Claims, 5 Drawing Sheets

(56) References Cited

U.S. PATENT DOCUMENTS

| | | | |
|---|---|---|---|
| 7,161,932 B1 * | 1/2007 | Watts | 370/352 |
| 7,181,209 B2 * | 2/2007 | Tamura | 455/432.1 |
| 7,349,373 B2 * | 3/2008 | An et al. | 370/331 |
| 7,546,125 B2 * | 6/2009 | Sharma et al. | 455/436 |
| 7,551,584 B2 * | 6/2009 | Kim et al. | 370/331 |
| 7,620,391 B2 * | 11/2009 | Itzkovitz et al. | 455/416 |
| 7,668,550 B2 * | 2/2010 | Tamura | 455/442 |
| 7,693,114 B2 * | 4/2010 | An et al. | 370/335 |
| 7,706,801 B2 * | 4/2010 | Tamura | 455/439 |
| 2002/0116464 A1 * | 8/2002 | Mak | 709/206 |
| 2005/0286466 A1 * | 12/2005 | Tagg et al. | 370/329 |
| 2006/0052113 A1 * | 3/2006 | Ophir et al. | 455/456.1 |
| 2006/0229078 A1 * | 10/2006 | Itzkovitz et al. | 455/445 |
| 2006/0276193 A1 * | 12/2006 | Itzkovitz et al. | 455/445 |
| 2006/0294245 A1 * | 12/2006 | Raguparan et al. | 709/227 |
| 2007/0091848 A1 * | 4/2007 | Karia et al. | 370/331 |
| 2007/0091907 A1 * | 4/2007 | Seshadri et al. | 370/401 |
| 2007/0094374 A1 * | 4/2007 | Karia et al. | 709/223 |
| 2007/0127357 A1 * | 6/2007 | Tamura | 370/202 |
| 2007/0254620 A1 | 11/2007 | Lindqvist et al. | |
| 2008/0013533 A1 * | 1/2008 | Bogineni et al. | 370/389 |
| 2008/0043659 A1 * | 2/2008 | Richards et al. | 370/313 |
| 2008/0076386 A1 | 3/2008 | Khetawat et al. | |
| 2008/0076392 A1 | 3/2008 | Khetawat et al. | |
| 2008/0076393 A1 | 3/2008 | Khetawat et al. | |
| 2008/0076411 A1 | 3/2008 | Khetawat et al. | |
| 2008/0076412 A1 | 3/2008 | Khetawat et al. | |
| 2008/0076419 A1 | 3/2008 | Khetawat et al. | |
| 2008/0076420 A1 | 3/2008 | Khetawat et al. | |
| 2008/0076425 A1 | 3/2008 | Khetawat et al. | |
| 2008/0096553 A1 * | 4/2008 | Saksena et al. | 455/426.2 |
| 2008/0119165 A1 * | 5/2008 | Mittal et al. | 455/411 |
| 2008/0132239 A1 | 6/2008 | Khetawat et al. | |
| 2008/0244148 A1 | 10/2008 | Nix, Jr. et al. | |
| 2009/0070469 A1 * | 3/2009 | Roach et al. | 709/226 |
| 2009/0086742 A1 * | 4/2009 | Ghai et al. | 370/401 |
| 2009/0156213 A1 * | 6/2009 | Spinelli et al. | 455/436 |
| 2009/0168766 A1 * | 7/2009 | Eyuboglu et al. | 370/353 |
| 2009/0215438 A1 * | 8/2009 | Mittal et al. | 455/418 |
| 2009/0257361 A1 * | 10/2009 | Deshpande et al. | 370/252 |
| 2010/0008259 A1 * | 1/2010 | Yoon et al. | 370/254 |
| 2010/0041375 A1 * | 2/2010 | Osborn | 455/411 |
| 2010/0041376 A1 * | 2/2010 | Osborn | 455/411 |
| 2010/0041424 A1 * | 2/2010 | Osborn | 455/466 |
| 2010/0048174 A1 * | 2/2010 | Osborn | 455/411 |
| 2010/0048175 A1 * | 2/2010 | Osborn | 455/411 |
| 2010/0048176 A1 * | 2/2010 | Osborn | 455/411 |
| 2010/0048216 A1 * | 2/2010 | Sundarraman et al. | 455/444 |
| 2010/0067371 A1 * | 3/2010 | Gogic et al. | 370/216 |
| 2010/0069072 A1 * | 3/2010 | Gogic et al. | 455/436 |
| 2010/0098040 A1 * | 4/2010 | Chu et al. | 370/338 |
| 2010/0195632 A1 * | 8/2010 | Prabhu | 370/338 |
| 2011/0106958 A1 * | 5/2011 | Thompson et al. | 709/230 |

* cited by examiner

HAND-OUT AND HAND-IN SUPPORT FOR LEGACY MOBILES SERVICED BY A FEMTOCELL ATTACHED TO AN IMS NETWORK

CROSS-REFERENCE TO RELATED APPLICATIONS

This application claims the benefit of Provisional U.S. Patent Application No. 61/201,836, filed on Dec. 15, 2008; this application is a continuation-of-part of U.S. patent application Ser. No. 12/172,238, filed on Jul. 13, 2008; U.S. patent application Ser. No. 12/172,238 claims benefit to Provisional U.S. Patent Application No. 60/949,846, filed Jul. 14, 2007; this application is a continuation-in-part of U.S. patent application Ser. No. 11/157,498, filed Jun. 21, 2005.

TECHNICAL FIELD

The following description relates generally to mobile device communication and, more particularly, to providing for effective handoff transitions of communications between wireless access points of packet switched networks and wireless access points of mobile core networks.

BACKGROUND OF THE INVENTION

Communication has become an ever increasing part of day-to-day life, both in business and personal lives. Accordingly, various forms of communication devices have become nearly ubiquitous. For example, a very large portion of the world's population have and utilize mobile devices, such as cellular telephones, personal communication system (PCS) phones, personal digital assistants (PDAs), smart phones, personal computers (PCs), etc., to provide voice and/or data communication. To provide highly mobile operation, such mobile devices often operate wirelessly to communicate with a host network. Thus, the mobile devices may be, for example, portable, pocket, hand-held, computer-included, or car-mounted devices which communicate voice and/or data wirelessly via a host radio network. Of course, such mobile devices can be fixed mobile devices, e.g., fixed cellular devices/terminals which are part of a wireless local loop or the like.

Cellular networks are well known for providing communications with respect to various mobile devices. In a typical cellular network, mobile devices communicate via a radio access network (RAN) to devices coupled to the cellular network. The RAN traditionally covers a geographical area which is divided into cell areas, with each cell area being served by a base station. The area coverage of such a base station, or cell area, is sometimes referred to as a macrocell. The base stations communicate over an air interface (e.g., radio frequencies) with the mobile devices or other mobile devices within range of the base stations. These base stations are typically positioned to bring the greatest coverage to the greatest number of cellular telephone users.

In the RAN, several base stations are typically connected (e.g., by landlines or microwave) to a radio network controller (RNC). The RNC, also sometimes termed a base station controller (BSC), supervises and coordinates various activities of the plural base stations connected thereto. The RNCs are typically connected to one or more systems (e.g., a mobile switching center (MSC)) providing the core communication services (e.g., call connect, call accounting, enhanced telephony services (ETSs) such as voice mail, one number service, call back service, language translation, call waiting, three-way calling, caller ID, do not disturb, and call forwarding service, public switched telephone network (PSTN) interfacing, etc.).

One example of a RAN is the universal mobile telecommunications (UMTS) terrestrial radio access network (UTRAN). The UMTS is a third generation system which in some respects builds upon the radio access technology known as global system for mobile (GSM) developed in Europe. UTRAN is essentially a RAN providing wideband code division multiple access (WCDMA) to mobile devices. Other types of cellular telecommunications systems which encompass RANs include, but are not limited to GSM systems, advance mobile phone service (AMPS) systems, narrowband AMPS (NAMPS) systems, total access communications system (TACS) systems, personal digital cellular (PDC) systems, United States digital cellular (USDC) systems, and code division multiple access (CDMA) systems (e.g., as described in EIA/TIA IS-95).

Cellular networks such as those described above are referred to herein as a "mobile core network" (or simply "mobile core") and typically provide a circuit switched network. It should be appreciated that, although terms typically associated with particular network standards and protocols have been used in describing exemplary mobile core networks above, mobile core networks as discussed herein may comprise various configurations, such as GSM, CDMA, time division multiple access (TDMA), UMTS, second generation (2G), third generation (3G), high speed packet access (HSPA), time division-synchronous code division multiple access (TD-SCDMA), time division-code division multiple access (TD-CDMA), etc. The makeup and functionality of these and other mobile core networks is well-known in the art and is thus not described further herein.

It should be appreciated that, in a traditional cellular network, the coverage of the macrocell base stations is often not uniform. For example, individual buildings (e.g., homes, offices, etc.) may have weak signals indoors. Accordingly, more recently the addition of femtocell base stations (sometimes referred to as "home base stations," "access point base stations," "3G access points," "small cellular base stations," and "personal 2G-3G base stations") has evolved.

In general, a femtocell base station is a small cellular base station designed for use in residential or small business environments. It connects to the service provider's network via a broadband packet switched network (such as using digital subscriber line (DSL), asymmetric digital subscriber line (ADSL), or cable internet) and typically supports 1 to 5 mobile devices (e.g., telephones) in a residential or business setting. In general, the femtocell incorporates the functionality of a typical base station but extends it to allow a simpler, self-contained deployment.

A femtocell base station allows service providers to extend service coverage within a targeted small geographic location, such as within a user's home or business—especially where access would otherwise be limited or unavailable—without the need for an expensive traditional cellular base station to be added to provide communication services for use by a small number of mobile devices. That is, although there may be hundreds or thousands of areas in which the mobile core network does not provide adequate coverage for communication services, each such area may have a very few mobile devices operated therein. Deploying a relatively small and inexpensive femtocell base station, leveraging a readily available broadband packet switched network such as the Internet to provide a communication link to the mobile core network, facilitates economic mobile device communications within these areas otherwise unserved or inadequately served by traditional macrocell base stations.

A femtocell base station may thus be deployed directly within a wireless subscriber's premises, such at a home or office. With a femtocell base station, the wireless communication device (e.g., cellular telephone) accesses the femtocell base station through traditional licensed spectrum. However, using such femtocell base stations, connectivity to the mobile core network is provided through the packet switched network using voice over internet protocol (VoIP) and/or internet protocol multimedia subsystem (IMS) technologies.

As can be appreciated from the foregoing, communication protocols and processing paths that are used in a network implementing a packet switched network (e.g. a femtocell), are different than those traditionally used for communication with the mobile core network. As a result, difficulties arise when a mobile device attempts to hand-in or hand-out between a femtocell and a macrocell.

Current solutions deployed in the market to address hand-in/hand-out difficulties do not support a hand-in to the femtocell network from a macrocell network, or a hand-out of the femtocell network to a macrocell network, while a mobile device is on an active call. As a result, an ongoing active call will be dropped either when a user is coming into the femtocell or leaving the femtocell.

One proposed solution to enable hand-in and hand-out of a mobile device during an active call is a voice call continuity (VCC) based approach. VCC approaches require mobile devices to be able to support concurrent calls on a mobile core network and on a packet switched network. Because the VCC based approach forces the mobile device to use its resources to support a redundant connection on two networks, needless overhead is created and devices must possess additional functionality to enable them to communicate on both networks simultaneously. In other words, mobile devices implementing a VCC approach can not be legacy devices (e.g. mobile devices adapted for mobile core network communications without specific adaptation for such communications to be provided via a packet switched network). Another limitation of the VCC solution is that in order to seamlessly hand off a call, the call must always be routed through a VCC server due to the inability to predict when a mobile device will enter or exit a femtocell or macrocell. As a result, even on a call that is between devices that are transmitting solely on a mobile core network, the call must be routed through the VCC server, thereby inserting inefficiency.

Another issue that results from differing protocols used in networks implementing a femtocell and those traditionally used for communication with a mobile core network is apparent when attempting to identify users within the different networks. In a packet switched network, or especially in an IMS network, users are often identified using a session initiation protocol (SIP) identifier or other identifier, which is similar to an email address (e.g. user@IMS.Tatara.com). Whereas in a mobile core network, users are typically identified using an MDN, which is a 10-digit mobile number. A packet switched network is not aware of the MDN and a mobile core network is not aware of the packet switched network public user identity. This introduces a problem because a user gets registered in the packet switched domain using the public user identity, whereas the real identity of that macro user is the MDN. So moving forward, if the carrier wants to handoff of the packet switched network's services, then it would need to know the MDN of the user.

Currently, if the MDN of the user is not known, in order to allow handoff of the packet switched network's services, the information must be downloaded from a visitor location register (VLR). So there is a disconnect between the databases of the differing networks. Another problem is if a user that is subscribed to an access point in a packet switched network (e.g. a femtocell) has moved onto another service provider network, for example from Sprint to Verizon, then the subscriber would need to be deleted from two separate databases, the home location register (HLR) database, and the home subscriber server (HSS) database. Therefore, currently there are two databases that need to be maintained for a femtocell subscriber being served.

BRIEF SUMMARY OF THE INVENTION

The present invention is directed to a system and method configured to implement an inter-MSC based handoff of a mobile device between a packet switched network and a mobile core network. In embodiments implementing a handoff from a packet switched network to a mobile core, from the perspective of a neighboring MSC on a mobile core network, information received from the packet switched network is perceived as having the same protocol as information which originates from the mobile core network. Inversely, in embodiments implementing a hand-in to the packet switched network from the mobile core network, information which originates from a mobile core network would be perceived having the same protocol as information in a packet switched network. Accordingly, a target MSC in a handoff is agnostic of the fact that the mobile device entering into the mobile core network was actually attached to a packet switched network. Thus, embodiments of the present invention allow existing inter-MSC based handoff solutions to be leveraged as opposed to a VCC method of doing a handoff.

Additionally, embodiments are configured to execute a handoff is without requiring the mobile device to simultaneously broadcast using two protocols. Further, embodiments provide for a seamless handoff between networks, even during active voice calls.

Some embodiments implement an inter-MSC based handoff of a mobile device between a packet switched network and a mobile core network by utilizing a convergence server. Such a convergence server is configured to communicate with, and gather information from, devices in the mobile core network. Using this information and communication abilities, the convergence server is able to communicate with the mobile core network in a manner which makes the convergence server appear to be an MSC. Hence, known inter-MSC based handoff techniques are able to be implemented between the mobile core network and the packet switched network.

Embodiments are also configured to manipulate communication trunks. For example, once a phone is handed off to the mobile core network, the communication path that was established with a femtocell will be diverted to the target MSC. Since aspects of the packet switched network may not have a dedicated media gateway server, embodiments of the present invention provide for a system, such as a convergence server, that is configured to manipulate a media server that is already in the path of the call. Using an existing media server to do the handoff and have the traffic diverted to the target MSC reduces the cost of the overall solution because the it allows the system to leverage existing media servers.

Embodiments may also function to assist in the identification and registration users entering areas which utilize different protocols. For example, a convergence server may be utilized identify new users and to notify relevant databases of the identifiers of a new user which are used separate networks. In this manner, networks that handle users that have multiple identifiers, for example an MDN and an SIP identity, are able to more efficiently hand off such users.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
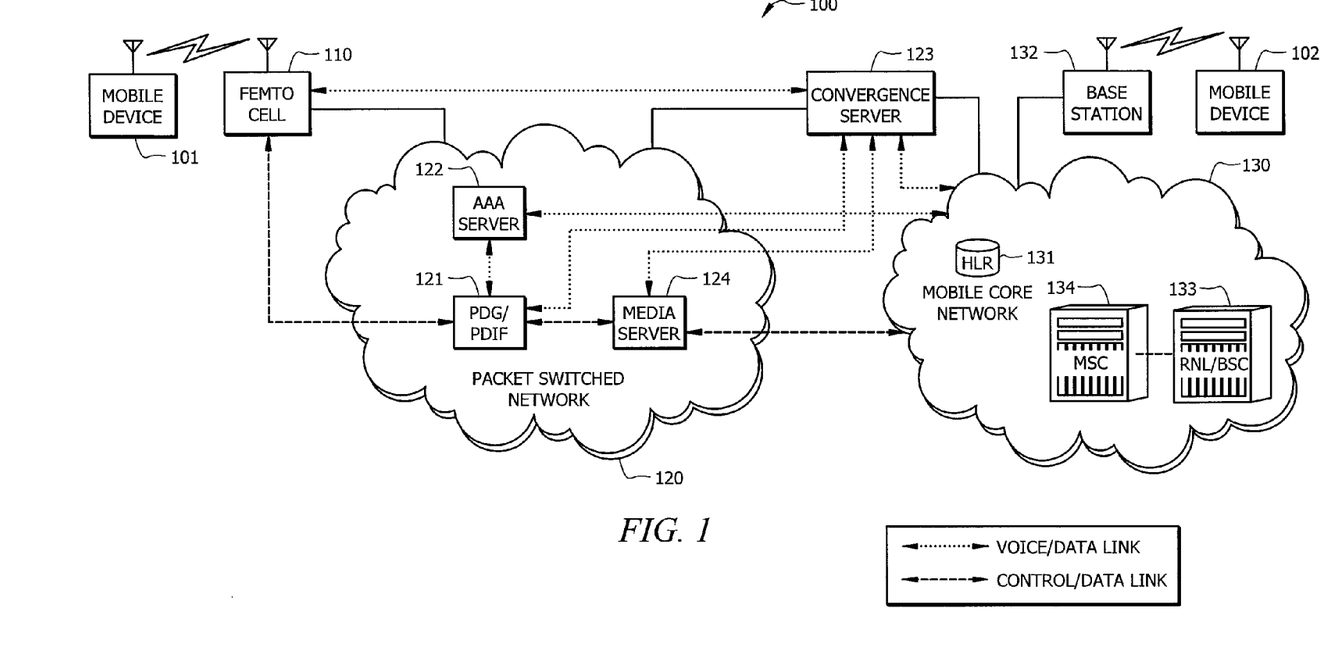
FIG. 1 shows a communication system adapted according to embodiments of the invention.

FIG. 1 shows communication system 100 adapted according to an embodiment of the invention. Communication system 100 of the illustrated embodiment includes femtocell base station 110 coupled mobile core network 130 via packet switched network 120. Communication system 100 is operable to provide for an inter-MSC based handoff between a macrocell and a femtocell for communication devices, such as mobile devices 101 and 102 which are on an active call and have need to hand-in/hand-out of the respective networks. As will be appreciated from the description of embodiments below, facilitating hand-in or a hand-out according to embodiments may be accomplished without modification to the legacy communication devices or mobile core network 130.

Mobile devices 101 and 102 of the illustrated embodiment may comprise various configurations of communication devices. For example, mobile devices 101 and 102 may comprise cellular telephones, personal communication system (PCS) phones, personal digital assistants (PDAs) (e.g., the BLACKBERRY device available from Research In Motion), smart phones, personal computers (PCs), etc., operable to provide voice and/or data communication. Mobile devices 101 and 102 are referenced herein as legacy communication devices in order to describe concepts of the present invention.

It should be appreciated, however, that communication system 100, including femtocell base station 110, may accommodate both legacy communication devices and non-legacy communication devices (e.g., communication devices which convert cellular signals to SIP and interfaces to a SIP-MSC inter-working function (IWF) which connects to the SIP (or IMS) network as well as the circuit-switched network).

Mobile core network 130 is adapted to provide communication services (e.g., cellular telephony service, short message service (SMS), general packet radio service (GPRS), multimedia broadcast service, etc.) to various communication devices, such as mobile devices 101 and 102. Specifically, mobile core network 130 of the illustrated embodiment includes systems, data, and interconnections providing a radio access network (RAN) for providing communication services to various communication devices. Accordingly, mobile core network 130 is shown to include base station 132 for communicating over an air interface (e.g., radio frequencies) with the mobile devices or other mobile devices within range (within the macrocell area) of the base station. Mobile core network 130 is additionally shown to include home location register (HLR) 131, such as may comprise a database of information (e.g., international mobile subscriber identity (IMSI), mobile subscriber integrated services digital network number (MSISDN), services enabled for the mobile device, settings to allow the mobile device to access packet services, visitor location register (VLR), serving GPRS support node (SGSN), enhanced telephony services (ETSs) settings, etc.) for each mobile device that is authorized to use mobile core network 130.

Mobile core network 130 may comprise additional or alternative systems, data, and interconnections. For example, embodiments of mobile core network 130 will typically comprise a large number of base stations connected (e.g., by landlines or microwave) to radio network controllers (RNCs) or base station controllers (BSCs) 133. Additionally, mobile core network 130 may comprise a mobile switching center (MSC) 134 communatively coupled to the RNCs/BSCs 133 and providing the core communication services. Mobile core network 130 of embodiments will typically be coupled to the public switched telephone network (PSTN) (not shown) so as to facilitate communications between mobile devices and devices coupled to the PSTN, including mobile devices of other mobile core networks also coupled to the PSTN.

General operation of a mobile core network, such as mobile core network 130, in providing communication services to a plurality of communication devices is well known and will not be discussed in detail herein. It should be appreciated, however, that the coverage areas provided by base stations (e.g., base station 132) of mobile core network 130 may not provide adequate coverage of all areas in which users wish to operate mobile devices for communication services. For example, coverage gaps, coverage shadows, etc. may exist in various areas, such as within a building, on the far side of a mountain or other terrain, etc. Likewise, coverage may not be provided in certain areas, such as in rural areas, beyond the physical service limits of the service provider, etc. Accordingly, femtocell base stations, such as femtocell base station 110, is utilized to provide communication services within areas otherwise not serviced or inadequately serviced by mobile core network 130.

Femtocell base station 110 of the illustrated embodiment comprises a small base station providing operation mimicking or emulating that of a base station, such as base station 132, of mobile core network 130. That is, femtocell base station 110 provides an air interface to mobile devices, such as mobile device 101, which functions the same as the air interface provided by a typical base station of mobile core network 130 (e.g., utilizes frequencies, channels, protocols, etc. native to the mobile core network), albeit at perhaps lower transmission power due to the typically smaller size of the femtocell coverage area. For example, femtocell base station 110 may comprise a universal mobile telecommunications (UMTS) configured base station containing a Node B, RNC and general packet radio service support node (GSN) with Ethernet for backhaul through packet switched network 120. Additionally or alternatively, femtocell base station 110 may comprise a configuration compatable with other communications solutions, such as GSM, CDMA2000, TD-SCDMA, and/or WiMAX.

The illustrated embodiment of femtocell base station 110 connects to mobile core network 130 via packet switched network 120. For example, femtocell base station 110 may utilize a digital subscriber line (DSL), asymmetric digital subscriber line (ADSL), or cable internet connection available at its deployment location to connect to packet switched network 120. Connectivity to mobile core network 130 may be provided through packet switched network 120 using such technologies as voice over internet protocol (VoIP), internet protocol multimedia subsystem (IMS), etc. Accordingly, femtocell base station 110 of embodiments may utilize various architectures, such as a SIP/IMS, based architecture or an IP RAN based architecture.

Packet switched network 120 of the illustrated embodiment comprises a broadband packet switched network providing information communication supporting digitized data exchange suitable for communication links between mobile devices, such as mobile device 101, and other devices, such as mobile device 102, devices coupled to the PSTN (not shown), devices coupled to packet switched network 120, etc. Accordingly, packet switched network 120 of the illustrated embodiment comprises packet data gateway/packet data information function (PDG/PDIF) 121, authentication, authorization, and accounting (AAA) server 122, convergence server 123, and media server 124 operable to facilitate communications according to embodiments of the invention.

PDG/PDIF 121 of embodiments provides a packet switched network data gateway facilitating data packet communication between devices, such as femtocell base station 110, and other devices of packet switched network 120. For example, PDG/PDIF 121 may provide interfacing, link security, protocol conversion, data packet routing, and/or other functions for network edge devices, such as femtocell base station 110.

AAA server 122 of embodiments provides centralized access, authorization and accounting management for devices to connect and use a network service of packet switched network 120. For example, AAA server 122 may implement internet protocol secuirty (Ipsec) protocols for establishing mutual authentication, negotiation of cryptographic keys to be used during a communication session, etc.

Media server 124 of embodiments provides media content arbitration between mobile core network 130 and devices coupled to packet switched network 120. For example, media server 124 may facilitate voice, video, and/or other media links between mobile core network 130 and mobile device 101 by accommodating the different protocols of mobile core network 130 and packet switched network 120.

Convergence server 123 of embodiments of the present invention provides interfacing between packet switched network 120 and mobile core network 130 which facilitates in providing the communication services of mobile core network 130 to mobile devices, such as mobile device 101, coupled to mobile core network 130 via packet switched network 120. For example, convergence server 123 of embodiments facilitates the hand-in/hand-out of legacy mobile devices on active calls which have need of transitioning between femtocell 110 and a macrocell supported by base station 132. Convergence server 123 of embodiments may provide control with respect to various systems and devices, such as femtocell base station 110, PDG/PDIF 121, AAA sever 122, media server 124, etc., to provide operation as described herein.

Convergence server 123 of embodiments further operates to provide functionality of a MSC for base stations (e.g., femtocell base station 110) coupled through packet switched network 120. Accordingly, convergence server 123 interacts with mobile core network 130, and other communication core networks (e.g., other mobile core networks, the PSTN, etc.), as a MSC to facilitate call setup, and other communications consistent with the communication protocols of such communications networks. Additionally, because convergence server 123 contains the functionality of an MSC, mobile devices 101 and 102 are able to seamlessly be handed between the protocols of core network 130 and packet switched network 120. This is also done without dropping the respective active calls, and without requiring mobile devices 101 and 102 to broadcast simultaneous calls on core network 130 and packet switched network 120.

Embodiments may also function to identify and register users entering areas which utilize different protocols. When a user, such as mobile device 101 is registered in the packet switched network, a third party registration is initiated to convergence server 123 which notifies convergence server 123 of the public user identity of that mobile device 101 that has been assigned on the packet switched network. A user registration is also implemented on HLR 131 using information from mobile device 101. Upon a successful registration and authentication in the HLR 131, the MDN of mobile device 101, which may be a 10-digit mobile identity number on the mobile core network 130, is downloaded to convergence server 123. At this point in time, convergence server 123 can notify a HSS (not shown), or AAA 122, of the association between the public user identity on the packet switched network, and the MDN identity of the subscriber. Convergence server 123 may also create a database association of the two different identities so that if future packet switched network services need to be provided to the mobile device when it is on the mobile core network, the packet switched network access the HSS and retrieve any information required for services, as opposed requesting that the convergence server get the information.

Figure 2:
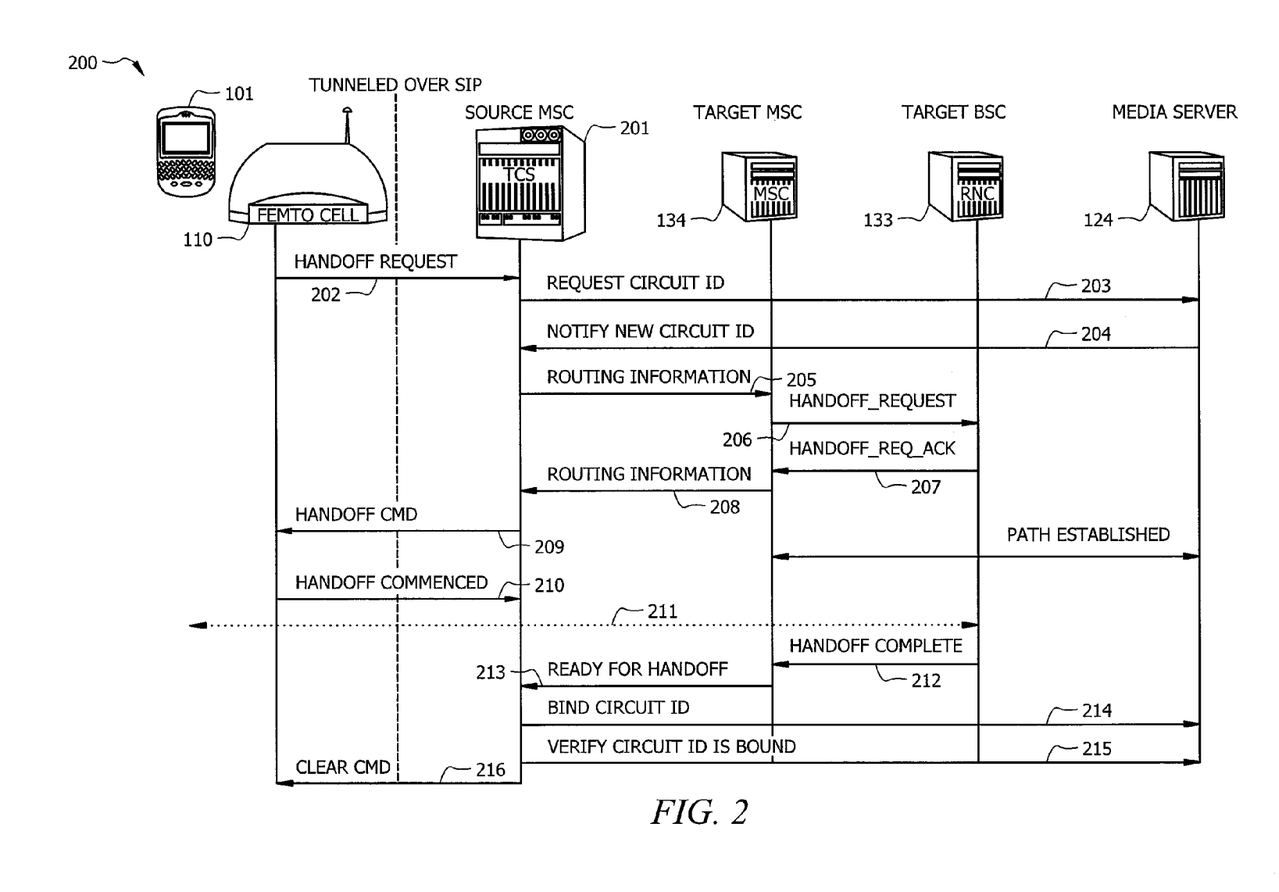
FIG. 2 shows a high level flow diagram of a hand-out routine according to embodiments of the invention.

FIG. 2 shows a high level flow diagram 200 of an exemplary hand-out routine wherein a mobile device is connected on an active call on a packet switched network, and is attempting to transition to a mobile core network. When mobile device 101 starts moving away from a packet switched network's access point, such as femtocell 110, mobile device 101 recognizes that a handoff is desired because, for example, the signal strength for a different base station is higher than that of femtocell 110, and therefore it initiates a handoff request to the femtocell 110. Femtocell 110 encapsulates information from the request and sends it to source MSC 201, in handoff request message 202. It is noted that in some embodiments, source MSC 201 may be implemented by convergence server 123. Source MSC 201 sends a request to media server 124 for to assign a new circuit ID 203. Since a convergence server, or source MSC 201, may not have a dedicated media gateway, embodiments may use media server 124 to establish a communication path. The circuit ID contains routing information corresponding to the communication path (e.g. the current availability of the path) which will be established after the handoff is complete. Media gateway server 124 responds to request 203 and notifies source MSC 201 of the new circuit ID 204. It is noted that request 203 and notification 204 may be implemented by using a SIP request. SIP protocol may be advantageous because it alleviates the need to implement other established media gateway control protocols.

Convergence server, or source MSC 201 may then take the new circuit ID information and use inter-MSC based messaging techniques to send routing information 205 (e.g. circuit ID information) for the device to target MSC 134. Target MSC 134 then sends a handoff request 206 to the target RNC 133 which obtains an and information from the base station 132 (FIG. 1) regarding its capacity and availability. Assuming that base station 132 is ready to support mobile device 101, target RNC 133 sends back an acknowledgement message 207 to target MSC 134, indicating that the mobile core network is prepared to provide access to mobile device 101. Target MSC 134 then relays this acknowledgement and any other routing information 208 (such as the availability information of base station 132) that source MSC 201 may desire.

At this point the source MSC 201 sends a handoff command 209 to femtocell 110, and femtocell 110 responds and notifies source MSC 201 that the handout has commenced 210. The mobile core network then sets up dummy traffic channel 211. Once dummy traffic channel 211 is established, then RNC 133 is able to send the handoff complete message 212 to target MSC 134. Target MSC 134 will then send a final message to source MSC 201 to indicate that the target MSC is ready for the handoff 213. In response, source MSC 202 sends an update message 214 to the media server 124 and informs media server 124 to bind the circuit ID that was provided initially. The circuit ID that was originally given by media server 124 is then bound and a message 215 reflecting such is conveyed to media server 124 from source MSC 201. Once those two contacts happen the source MSC sends a clear command 216 to femtocell 110 which causes femtocell 110 to terminate its communication path with mobile device 101.

As stated above, methods, such as the one shown above, which use a convergence server to work as an MSC in order to hand off active calls to a target MSC offer significant advantages over present femto/macrocell communication systems, including elimination of redundancy, simplification of mobile devices, and better performance with active mobile device calls. The convergence sever is able to function as an MSC as a result of the communication abilities shown herein (e.g. using SIP to send the commands down to the media gateway server, and to communicate with the femtocell). It is noted that other communication protocols may be used with the convergence server such as H248. However, at the present time SIP appears to be the simplest way to communicate between the convergence server and the media server.

Figure 3:
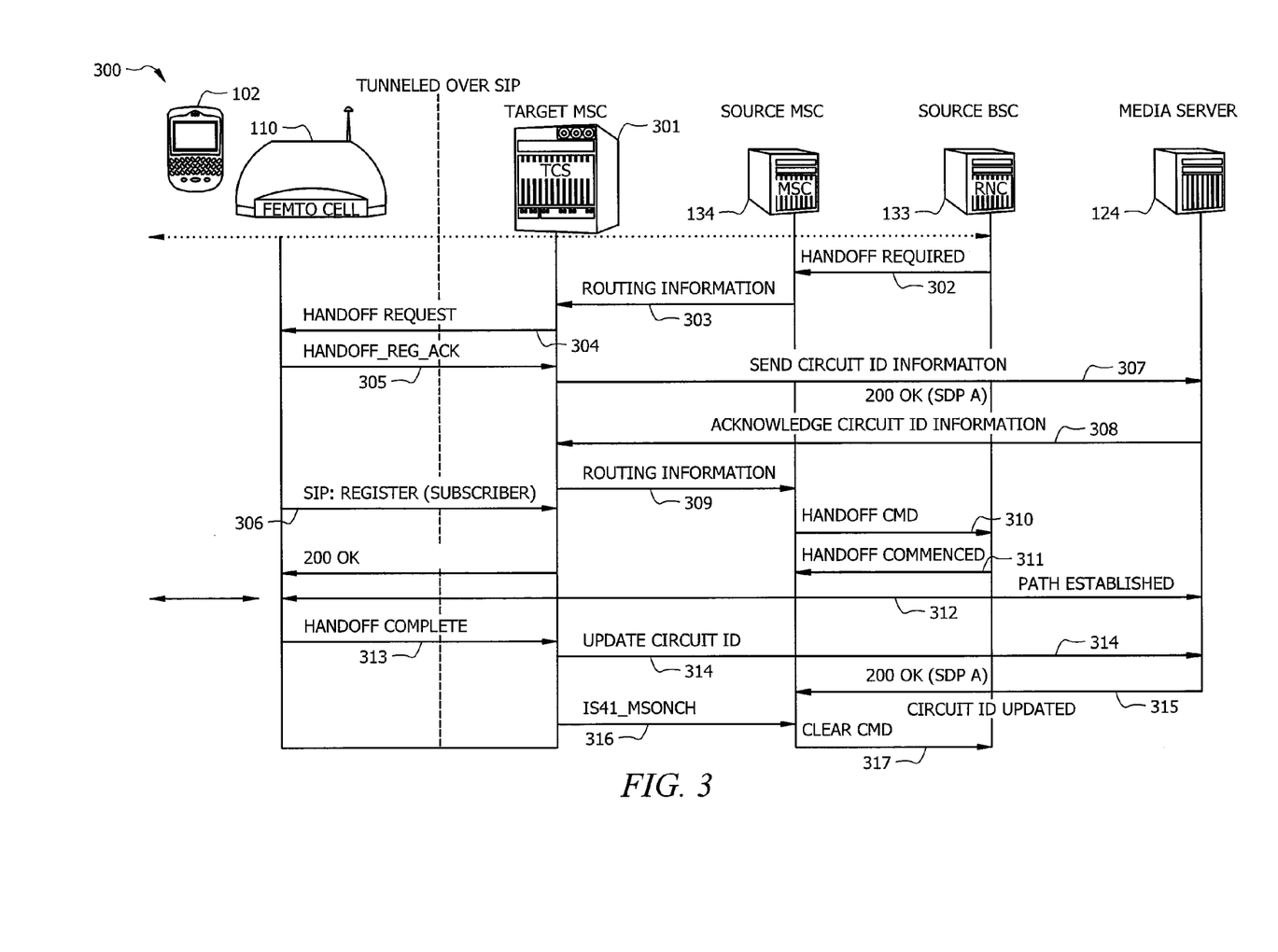
FIG. 3 shows a high level flow diagram of a hand-in routine according to embodiments of the invention.

FIG. 3 shows a high level flow diagram 300 of a hand-in routine wherein a mobile device 102 is connected on an active call on a mobile core network, such as mobile core network 130, and is attempting to transition to a packet switched network, such as packet switched network 120. In this case, RNC 133 would initiate a handoff required message 302 to the MSC that is serving mobile device 102, e.g. MSC 134, which for this embodiment is the source MSC. Source MSC 134 sends to MSC 301 (which is now the target MSC), a directed message 303 containing routing information including information about mobile device 102. Target MSC 301 in this embodiment may also be implemented by convergence server 123. Target MSC 301 initiates a handoff request message 304 to the packet switched network's access point, shown as femtocell 110. The handoff request is then acknowledged 305 by femtocell 110.

Since femtocell 110 is a known device on the packet switched network, i.e. it is registered, handoff request message 304 will go through an packet switched network. But since the mobile device 102 is not registered in the packet switched network, when subsequent messages are sent over the packet switched network, mobile device 102 will not receive the messages. Thus, it is preferable to register mobile device 102 on the packet switched network. One method of registering mobile device 102 is implemented by the having the access point, such as femtocell 110, send message 305 to register, via packet switched network 120, mobile device 102 based on the information provided about the mobile device in handoff request 304. Message 305 may be sent, for example, by using SIP or any other protocol compatible with the network devices. This registration method will result in having subsequent messages sent to mobile device 102 sent to femtocell 110, which can then be relayed to mobile device 102. Registration methods, such as the ones described herein are also set forth in concurrently filed application referenced above entitled "Security for Legacy Communication Devices when Operating on Packet Switched Networks."

It is noted that there are other methods to register the mobile device. The example set forth above utilized femtocells which undertook the registration on behalf of the handset, even though the handset is not fully moved into the femtocell. Another exemplary method for registering the mobile device entails using the convergence server can finish the registration directly using the HSS interface, and the information coming into the IMS code.

At this point the circuit ID is known, and an invite is sent with that circuit ID information 307 to media server 124. Media server 124 is notified that this circuit ID needs to be tied to a call to be routed to femtocell 110, and media server 124 acknowledges such in response message 308. Routing information 309 is then sent from target MSC 301 to source MSC 134.

At this point, a handoff command 312 may be sent to RNC 133 and RNC 133 responds with a handoff commenced message 310. Once the handoff commenced message 311 is sent, a dummy path 312 is established. Finally, the femtocell sends a handoff complete message 313 and that will trigger the target MSC 301 to send an update 316 to the previous circuit ID information 307 message that was previously sent to media server 124 to notify media server 124 that the call will be routed through target MSC 304. And a response 315 is sent to the source MSC once the update 314 is complete. At this point an on channel signal 316 is sent to source MSC 303, and source MSC 303 will send a clear command 317 to RNC 133, which will release the traffic channel for mobile device 300 that just entered into femtocell 307.

Figures 4A, 4B:
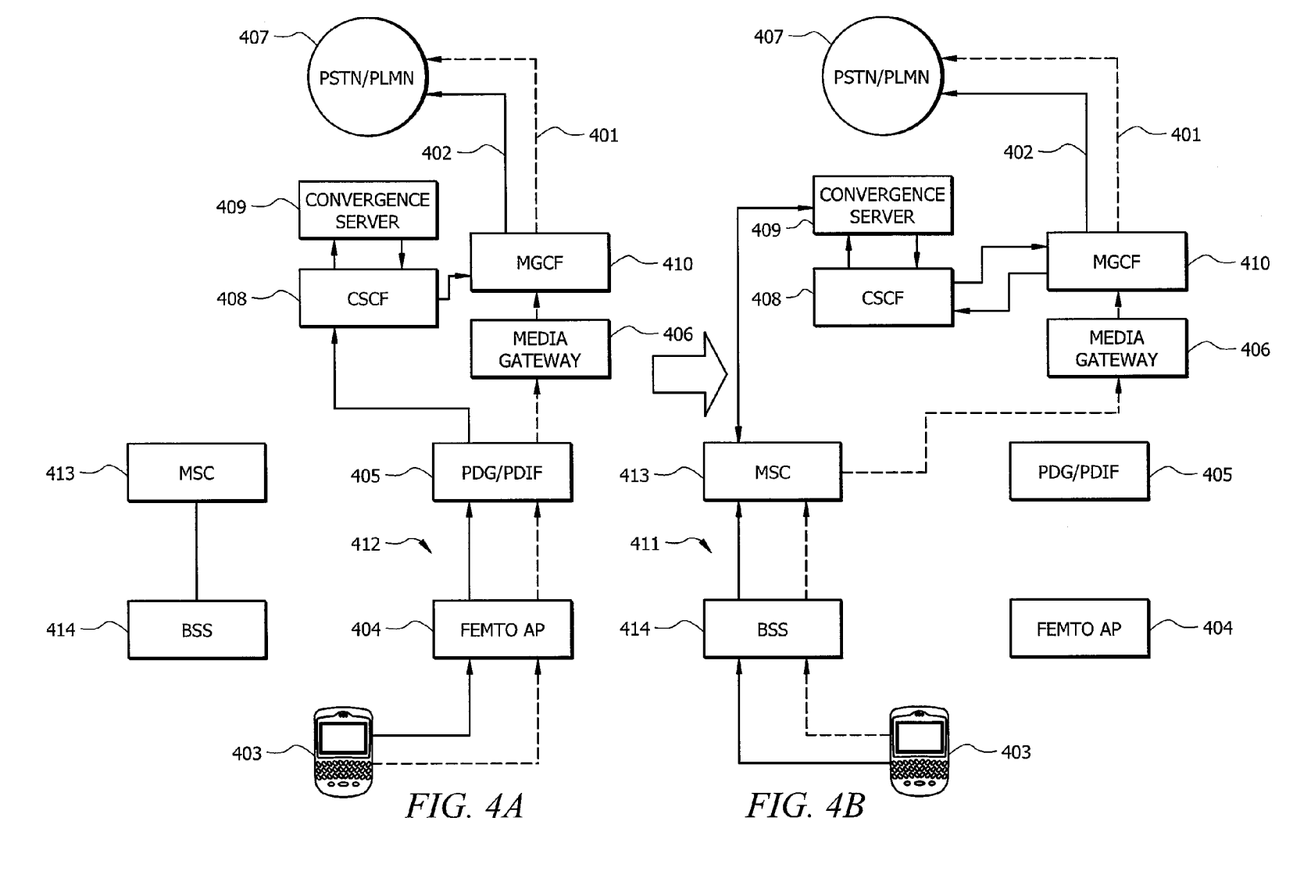
FIGS. 4A, 4B, 5A and 5B show changes in communication paths as a result of handoff events according to embodiments of the invention.

FIGS. 4A and 4B illustrate the movement of a data path 401 and control path 402 which occurs as a result of a handout of a femtocell to a mobile core, such as is illustrated in FIG. 2. In FIG. 4A mobile device 403 is in communication with femtocell access point 404 and PDG/PDIF 405 when mobile device 403 is communicating on a packet switched network. The data path 401 is routed through media server 406 and MGCF 410, and then to a destination, such as PTSN 407. The control path is sent through call session control function circuitry (CSCF) 408, and then to the convergence server 409. Convergence server 409 routes control path 402 back through CSCF 408 and then to MGCF 410 for. After the MGCF, data signal 402 is sent to PTSN 407.

Embodiments are also configured to manipulate communication trunks. For example, as shown in FIGS. 4A and 4B, once mobile device 403 is handed off to the mobile core network 411, data path 401 that is going through the femtocell 412 will be diverted to target MSC 413. Data path 401 will also pass through base station 414 and connects with mobile device 403. Control path 402 will also span between MSC 413 and convergence server 409. It is also noted that signaling system protocols, such as signaling system number 7 (SS7), may control various aspects of the illustrated communications paths, such as the control path between MSC 413 and convergence server 409.

Since convergence server 409 does not have a dedicated media server, embodiments of the present invention provide for a convergence server that is configured to manipulate media server 406 which is already in the path of the call. For example, embodiments of the present invention provide for a convergence server that is configured to utilize media server which is part of a VOIP, IMS network, etc., to have the traffic from the mobile core network directed towards the media server, and the media server can direct the flow of traffic to the target MSC. Sharing an existing media server to do the handoff and have the traffic diverted to the target MSC reduces the cost of the overall solution because the it allows the system to leverage existing media servers.

Figure 5A:
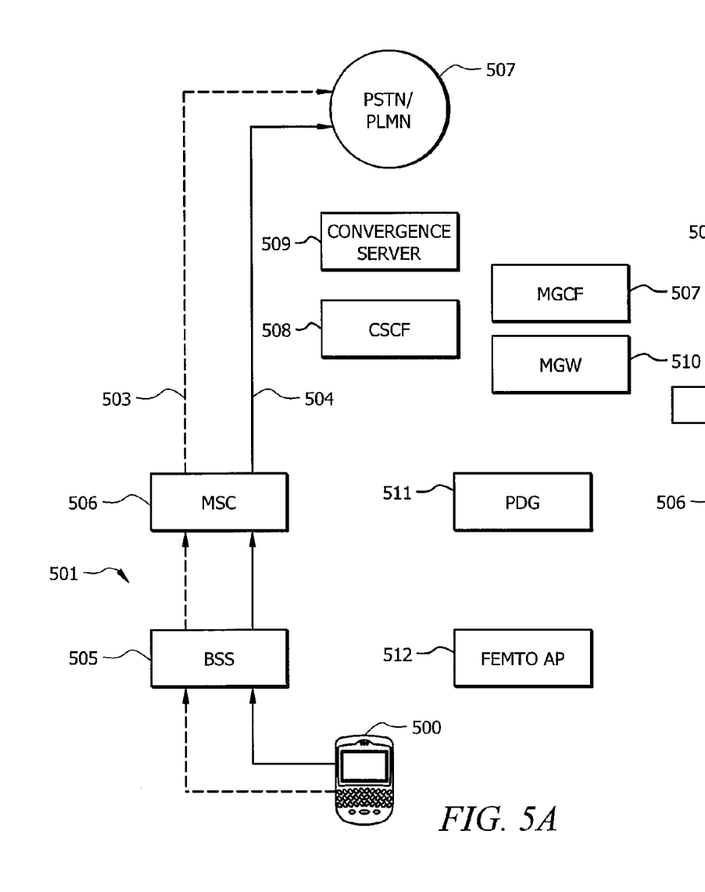
Figure 5B:
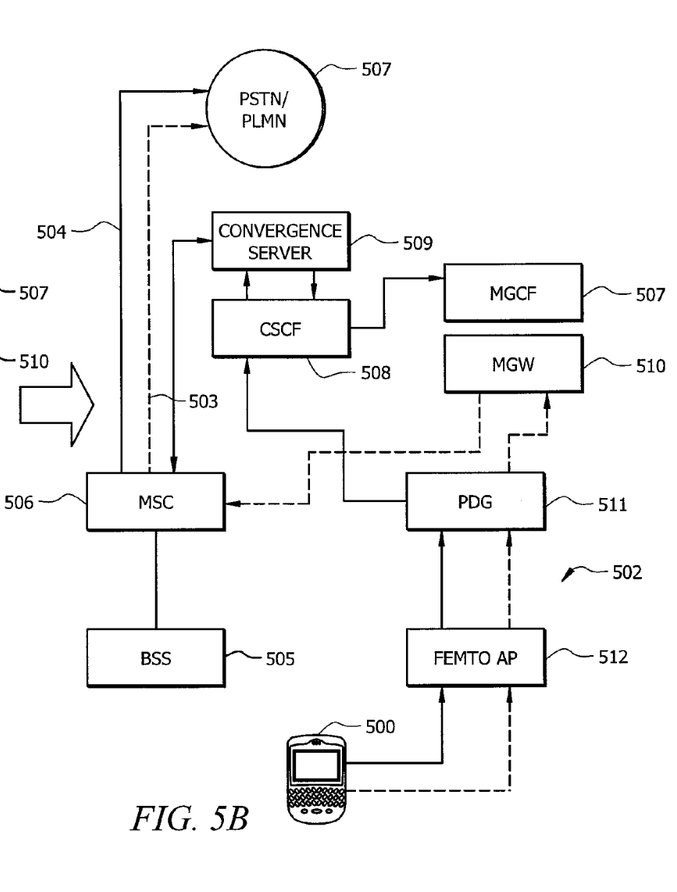

Likewise, FIGS. 5A and 5B show mobile device 500 which is being handed-in from macrocell 501 to femtocell 502, such as is illustrated in FIG. 3. When mobile device 502 is communicating on macrocell 501 the data path 503 and control path 504 are both directed through BSS 505 and MSC 506 to their destination, such as PTSN 507. When a handoff request is communicated, the control path 504 is diverted from MSC 506 to connect to convergence server 509, which is also in communication with MGCF 507 and CSCF 508. Embodiments of the present invention cause convergence server 509 to appear to MSC 506 as being another MSC, and in this case the target MSC. Convergence server 509 causes MSC 506 to divert the data path 503 to media server 510 and it is then routed through PDG 511 and femtocell access point 512 and then to mobile device 500. Control path 504 is also routed through PDG 511 and femtocell access point 512 and then to mobile device 500. As can be seen by this illustration, after the hand-in is complete, the communication path through the MSC 506 is still utilized and in the femtocell communication paths. Additionally, as with the example of FIGS. 4A and 4B, signaling system protocols, such as SS7, may control various aspects of the illustrated communications paths, such as the control path between MSC 506 and convergence server 509.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for handing off a mobile device from a femtocell to a mobile switching center, the method comprising;
   responsive to the mobile device identifying that signal strength for base station is higher than signal strength for femtocell, sending, from the mobile device a first handoff request to the femtocell;
   responsive to receiving the first handoff request from the mobile device, encapsulating, by the femtocell, information from the handoff request into a handoff request message, and sending the handoff request message to a convergence server;
   responsive to receiving the handoff request message, sending to a media server, by the convergence server, a request to assign a new circuit identification;
   responsive to receiving the request to assign the new circuit identification, assigning, by the media server the new circuit identification, and conforming the convergence server of new circuit identification;
   responsive to receiving the new circuit identification, sending, by the convergence server, routing information for the mobile device to a target mobile switching center;
   responsive to receiving routing information for the mobile device, sending, by the target mobile switching center, a second handoff request to a target radio network controller;
   responsive to receiving a second handoff request from the target mobile, determining, by the switching center, whether a base station can support the mobile device by obtains information from the base station regarding capacity and availability of the base station;
   responsive to determining that the base station can support the mobile device, sending, by the target radio network controller, an acknowledgment message to the target mobile switching center;
   responsive to receiving the acknowledgment message at the target mobile switching center, relaying, by the target mobile switching center, the acknowledgment message to the convergence server;
   responsive to receiving the acknowledgment message at the convergence server, sending, by the convergence server, a handoff command to the femtocell;
   responsive to receiving the handoff command at the femtocell, sending by the femtocell, a response to the convergence server that a handoff has commenced;
   initiating, by the convergence server, a dummy traffic channel between the target mobile switching and the target radio network controller;
   responsive to establishing a traffic channel, sending, by the target radio network controller, a handoff complete message to the target mobile switching center;
   responsive to receiving the handoff complete message from the target radio network controller, sending, by the target mobile switching center, a ready-for-handoff message to the convergence server;
   responsive to receiving the ready-for-handoff message, sending, by the convergence server, and update message to the media server informing the media server to bind a new circuit identification to the dummy traffic channel;
   responsive to receiving the update message, binding, by the media server, the new circuit identification, and notifying the convergence server that the new circuit identification is bound;
   responsive to receiving notification that the new circuit identification is bound, sending, by the convergence server, a clear command to the femtocell; and responsive to receiving the information, terminating, by the femtocell, a communication path between the mobile device and the femtocell.

2. A method for handing off a mobile device communicating on a first communication path, said method comprising:
- receiving a handoff request from an access point hosting said mobile device;
- processing said handoff request at a system which arbitrates communications between a packet switched network and a mobile core network, said system configured to relay information on a packet switched network and further configured to appear to components of said mobile core network as being a switching device;
- executing an inter-MSC based handoff between said system and an MSC connected to said mobile core network;
- establishing a second communication path for said mobile device, said second communication path including a second access point to service said mobile device, said second access configured to communicate on different network type than the network of said first access point, wherein said system utilizes a media server which is in said first communication path to establish said second communication path and keeps said media server in said second communication path after handing off said mobile device; and
- handing off said mobile device.

3. The method of claim 2 wherein said system is configured to appear to components of said mobile core network as being a mobile switching center (MSC).

4. The method of claim 2 wherein said system is configured to utilize a media server to establish said second communication path.

5. The method of claim 2 wherein said first access point is a femtocell and said second access point is a base station in a cellular network.

6. The method of claim 2 wherein said first access point is a base station in a cellular network and said second access point is a femtocell.

7. The method of claim 2 wherein said mobile device is a legacy mobile device.

8. The method of claim 2 wherein said system comprises a convergence server.

9. The method of claim 2, wherein said handoff request from said access point was initiated by said mobile device.

10. The method of claim 9, wherein said mobile device initiated the handoff when said mobile device recognized that the handoff was desired.

11. The method of claim 10, wherein said mobile device recognized that the handoff was desired because a first signal strength for a different base station was determined by said mobile device to be higher than a second signal strength of said access point.

12. A system for compensating for differing communication protocols in a packet switched network and a mobile core network, said system comprising:
- a convergence server, said convergence server configured to facilitate a handoff of a legacy mobile device between a packet switched network and cellular core network while maintaining an active call, wherein said convergence server is configured to identify and register users entering areas which use different protocols, and wherein said convergence server maintains a database containing both a packet switched network public identity and a mobile core network identity for one or more mobile devices.

13. The system of claim 12 wherein said convergence server obtains information about an packet switched network public identity and an mobile core network identity notifies a home subscriber server (HSS) of such identities.

14. The system of claim 12 wherein said convergence server is configured to be a mobile switching center (MSC) and implement inter-MSC based handoff functionality.

15. The system of claim 14 wherein said convergence server is configured to communicate with a media server using session initiation protocol (SIP).

16. The system of claim 12 wherein said convergence server is configured to manipulate communication trunks of said mobile devices.

17. The system of claim 12 wherein said convergence server does not have a dedicated media server and is configured to utilize a media server that is part of an existing communication path.

18. A method comprising:
- receiving, by a system which arbitrates communications between a packet switched network and a mobile core network, a handoff request from an access point hosting a mobile device, said access point connected to one of said packet switched network and said mobile core network;
- requesting, by said system, routing circuit information from a media server controller;
- communicating, by said system, said routing circuit information with a mobile switching center (MSC);
- handing off said mobile device to a second access point using said routing circuit information, said second access point being connected to the other of said packet switched network and said mobile core network.

19. The method of claim 18 further comprising handing off said wireless device from said packet switched network to said mobile core network.

20. The method of claim 19 further comprising handing off said wireless device from said mobile core network to said packet switched network.

21. The method of claim 18 wherein said mobile device is a legacy mobile device.

22. The method of claim 18 wherein said system is a convergence server configured to be a mobile switching center (MSC).

* * * * *